United States Patent [19]

Hara et al.

[11] 3,929,298

[45] Dec. 30, 1975

[54] ENDLESS TAPE TRANSPORTING DEVICE

[75] Inventors: Satoshi Hara, Kanagawa; Morio Akino, Fujisawa; Keizo Nakagawa, Chigasaki, all of Japan

[73] Assignee: Tokyo Shibaura Electric Co., Ltd., Kawasaki, Japan

[22] Filed: Sept. 20, 1973

[21] Appl. No.: 399,250

[30] Foreign Application Priority Data

Sept. 22, 1972 Japan ............................... 47-95591

[52] U.S. Cl. ........................... 242/55.19 R; 226/118

[51] Int. Cl.² .......................................... B65H 17/48

[58] Field of Search... 242/55.19 R, 55.19 A, 55.17, 242/55.6, 179; 226/118, 95, 97, 91

[56] References Cited

UNITED STATES PATENTS 2,464,965 3/1949 Chemel........................ 242/55.19 A 2,643,118 6/1953 Burson, Sr. .................. 242/55.19 R

FOREIGN PATENTS OR APPLICATIONS 1,087,368 10/1967 United Kingdom.......... 242/55.19 R

*Primary Examiner*—Leonard D. Christian
*Attorney, Agent, or Firm*—Oblon, Fisher, Spivak, McClelland & Maier

[57] ABSTRACT

An endless tape transporting device has a loop buffer mechanism in a route of an endless tape. The loop buffer mechanism has three guides for guiding the tape so that the tape declined from between a capstan and a pinch roller is wound on a reel while slackened substantially in an S-shape.

10 Claims, 3 Drawing Figures

ENDLESS TAPE TRANSPORTING DEVICE

This invention relates to an endless tape transporting device, particularly, but not exclusively, to an endless tape transporting device suitable for a magnetic recording and reproducing apparatus.

A magnetic recording and reproducing apparatus using an endless tape is widely used in recording and reproducing an aural signal. However, an apparatus for recording and reproducing a video signal is not yet realized. Where the video signal is recorded and reproduced, it is necessary to record and reproduce a signal having a very high frequency as compared with the case where an aural signal is recorded and reproduced. With an endless tape transporting device wherein a tape travels by the head which never moves in the running direction of the tape, a tape is required to be travelled at a speed of more than 3 m/sec. However, it is very difficult to remove an irregular travel of the tape as encountered when the tape is travelled at a high speed. The irregular travel of the tape results in the wavering or distortion of a reproducing image with the consequent inconvenience. Great efforst have heretofore been made to remove such disadvantages with little success.

Explanation is now made of a conventional endless tape transporting device. FIG. 1 shows a conventional endless tape transporting device. A buffer mechanism for an endless tape comprising two guide plates and receiving a slack portion of the tape is provided in a route in which the tape delivered from between a capstan 1 and a pinch roller 2 is wound on a reel 3. In this case, the tape is slackened within the buffer mechanism and is meandered, taking a variety of forms as shown, for example, by A, B etc. in FIG. 1 and wound on the reel. Since the slack portion of the tape is meandered and collides with the guide plates 5 and 6 in many points, the tape is injured and noises are produced. Furthermore, the tape tension is varied to a greater extent, failing in obtaining a uniform winding of the tape as well as a stable travel of the tape. To remove these disadvantages there has been proposed a method of causing a tape 4 to travel, for example, with a great deal of sagging. However, this results in a greater buffer mechanism and thus a greater device as a whole.

This invention is to provide an endless tape transporting device having a small-sized loop buffer mechanism which, even when a tape is travelled at a high speed of more than 3 m/sec., can remove the above disadvantages as encountered in the conventional device; can minimize noises as well as injury to the tape; and can stably wind the tape on a reel under a uniform tape tension and at a uniform speed.

To attain such objects, there is provided an endless tape transporting device comprising an endless tape reel adapted to coil a tape into a laminated coil so that the tape is delivered from the innermost of the laminated coil and wound on the outermost of the laminated coil; a capstan and a pinch roller between which the tape is driven; a loop buffer mechanism provided in a route in which the tape delivered from between the capstan and the pinch roller is wound on the reel, and having first, second and third guides; said first guide adapted to guide the tape so delivered in a direction in which the pinch roller is rotated, said second guide along which the tape is headed from the first guide towards the reel, and said third guide adapted to cause the tape from the second guide to turn back halfway in a direction of the first guide so that substantially one loop is created, and then guide it towards the reel.

Since the endless tape transporting device is equipped with such loop buffer mechanism the tape delivered from between the capstan and the pinch roller is stably travelled in a manner that substantially one loop is created within the loop buffer mechanism, and wound on the reel under a uniform tension and at a uniform speed without being freely meandered and vibrated. With this endless tape transporting device, therefore, a good recording and reproducing can be attained.

The tape initially travels at a slow rate by the capstan and pinch roller. The first guide may consist of a guide plate disposed in an inclined state in the passageway of the tape to guide it forward. The tape is guided onto the guide plate and begins to create a loop. As the first guide, a guide pole is additionally provided behind the guide plate so that the guide plate is supported and reinforced.

The second guide may be a guide plate extending from the proximity of the pinch roller towards the proximity of the reel. When the tape speed attains, for example, more than 1 m/sec. the tape leaves the first guide and is travelled along the second guide as far as it turns back halfway to provide substantially one half loop (see a curve B of FIG. 2). A curve A of FIG. 2 shows a route along which a tape is travelled at the start of the tape.

The third guide may be a guide pole disposed in the neighborhood of the first guide on the side of the reel. The tape from the second guide is passed around the outer periphery of this guide pole and wound on the reel. As the third guide, a guide plate may be additionally provided in proximity to the guide pole. In this case, the tape is passed between the guide pole and the guide plate and wound on the reel. Since the tape is travelled along the guide plate it is not meandered or vibrated between the third guide and the reel. When the guide plate is used in a high speed endless tape transporting device, a particularly effective result is obtained.

When the guide plate of the first guide and the guide pole of the third guide are located in the following relation, then a stable tape travel is obtained. That is, the tape is preferably caused to travel at an angle of more than 30° which is defined between the direction in which it is moved through the guide plate of the first guide and the direction in which the tape is directly moved from the first guide towards the third guide without forming any buffer loop.

Even when the tape starts to travel with a little or no sagging and is sufficiently supplied, the tape can travel towards the second guide to form a normal buffer loop without running through the third guide to form an inconvenient sagging in the neighborhood of the reel. Thus, the tape comes to travel immediately under a normal travelling condition, even in such a case, without involving any mess.

If the endless tape transporting device is used in combination with a driving mechanism for the transporting device, and a recording and reproducing unit, then it is possible to obtain an endless tape recording and reproducing apparatus suitable for use at a high speed.

Figure 1:
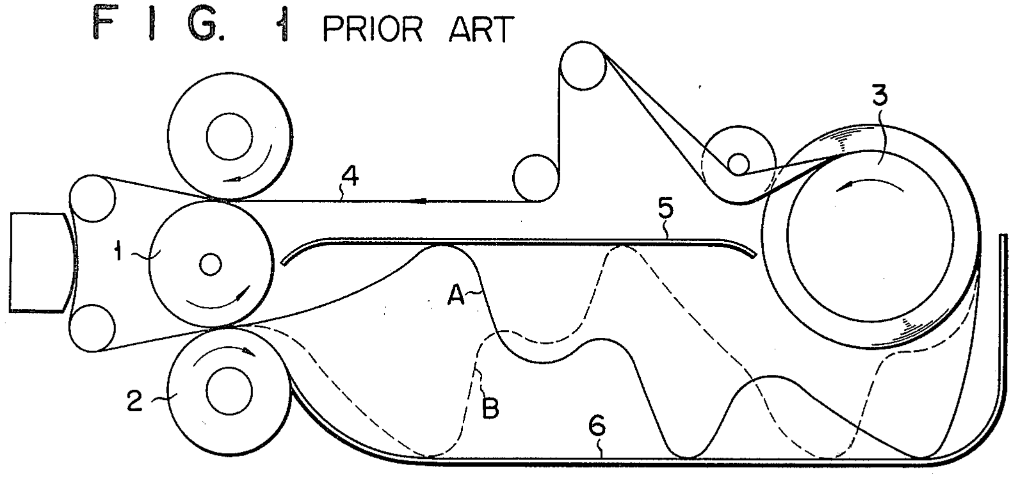
FIG. 1 PRIOR ART
FIG. 1 is an explanatory view showing a conventional high speed endless tape transporting device.
Figure 2:
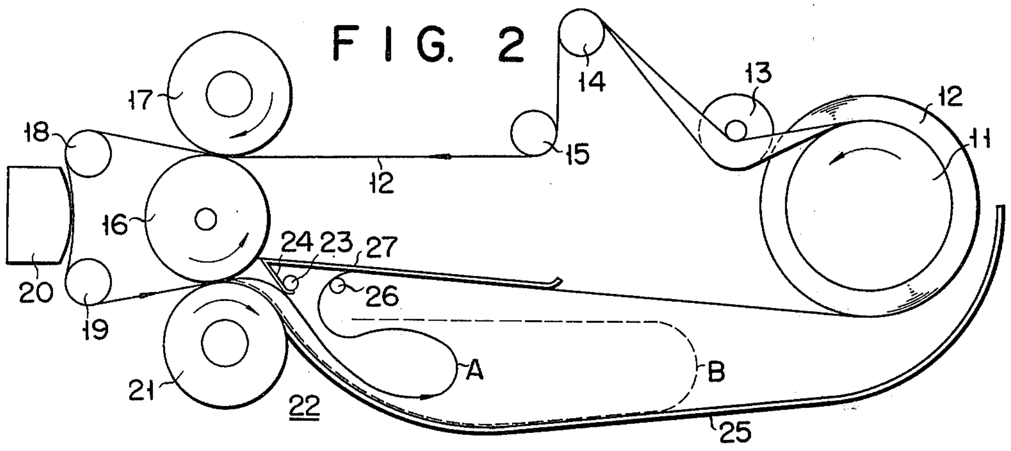
FIG. 2 is an explanatory view showing one embodiment of an endless tape transporting device according to this invention.

In FIG. 2 a reference numeral 11 shows a circular reel for an endless tape which has at its peripheral side a groove V-shaped in cross section. On the peripheral side of the reel an endless tape 12 is coiled into a laminated coil. The tape 12 is delivered from the innermost of the laminated coil and passed through a conical guide pole 13 and guide poles 14, 15 to a nip between a capstan 16 and a pinch roller 17. Then, the tape 12 is withdrawn from the nip, and passed through a guide pole 18, a recording and reproducing head 20 and a guide pole 19 to a nip between the capstan 16 and a pinch roller 21 where it is fed towards a loop buffer mechanism 22. Then, it is passed through the mechanism 22 and wound on the outermost of the laminated coil. The mechanism has first, second and third guides. The first guide comprises a guide pole 23 and a guide plate 24 which are provided in a travelling direction of the tape 12 delivered from the nip between the capstan 16 and the pinch roller 21.

The second guide includes a guide plate 25 extending from the neighborhood of the pinch roller 21 up to the neighborhood of the reel 11 in a manner to describe a gentle curve.

The third guide comprises a guide pole 26 and a guide plate 27 provided in proximity to the first guide and on the side of the reel.

The first guide serves to guide onto the guide plate 24 the tape 12 withdrawn from between the capstan 16 and the pinch roller 21 to cause a change in its direction to permit it to be travelled in a direction of the rotation of the pinch roller 21. Then, the tape 12 from the first guide is brought into an engagement with the second guide to cause it to be guided towards the reel 11. The third guide causes the tape 12 so travelled to turn back halfway so that substantially one loop is created and then causes it to be passed between the guide pole 26 and the guide plate 27 to permit it to be travelled straight towards the reel 11.

When the endless tape transporting device is situated at its initial slow speed, a slack tape assumes a form as shown by A in FIG. 2. When the device is normally operated, the tape 12 trapped within the loop buffer mechanism assumes a larger form as shown by B in FIG. 2. In this way, the slack portion of the tape 12 is varied depending upon the operating conditions. Since the tape 12 is guided by the second and third guides to provide a loop, it is not freely meandered or vibrated within the loop buffer mechanism as encountered in the conventional device. The tape 12, after being passed between the guide pole 26 and the guide plate 27, is guided along the guide plate 27 and wound on the reel 11. Therefore, the tape 12 is not meandered or vibrated in a space between the third guide and the reel 11.

The endless tape transporting device according to this invention subjects the tape 12 to far less injury and noise than the conventional one. Since the tension, speed etc. of the tape 12 are varied little, the tape 12 is stably wound on the reel 11 and good recording and reproducing can be attained.

In the above explanation, the guide pole 23 may be omitted if a rigid guide plate 24 is formed. When a tape speed is relatively slow, the guide plate 27 may be omitted. Even in this case, the tape 12 is not meandered or vibrated in a space between the third guide and the reel 11.

Figure 3:
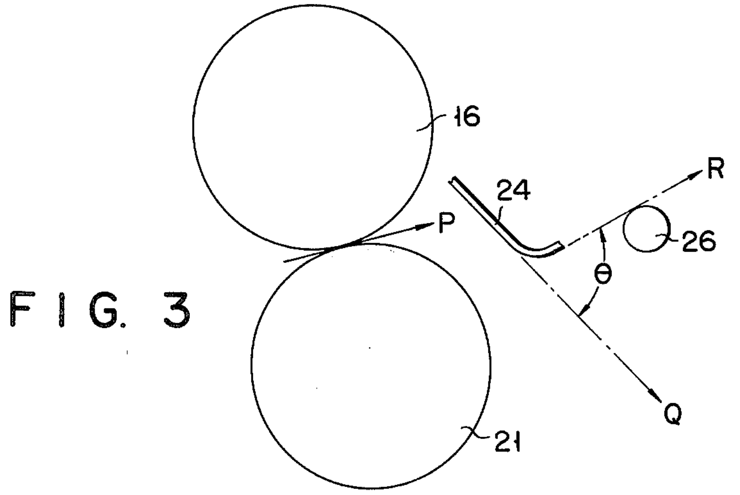
FIG. 3 is an explanatory view showing a relation between a first guide and a third guide.

A symbol $\theta$ as shown in FIG. 3 indicates an angle defined between a direction Q and a direction R. In this case, Q is a direction in which the guide plate 24 of the first guide is arranged and R is a direction of a tangent line obtained by connecting the outer surface of the guide plate 24 and the outer circumference of the guide pole 26 of the third guide. When the angle $\theta$ is too small, there is a fear that the tape 12 is fed directly towards the third guide in a case where the device is started. Therefore, the angle $\theta$ is taken to be more than 30°. P shows a direction in which the tape 12 is fed from between the capstan 16 and the pinch roller 21 when it is travelled at a slow speed.

Though, with the above embodiment, an endless tape 12 is taken as a magnetic tape, this invention can be applicable to a system for recording a signal as a groove on a tape made of synthetic resin or the other material, as is found in a "record", and reproducing it through an electromechanical transforming element, or a system for recording a shade of signals on a film and photoelectrically reproducing them.

What we claim is:

1. An endless tape transporting device for transporting a tape at a high rate of speed comprising:

an endless tape reel adapted to coil an endless tape into a laminated coil so that the tape is delivered from the innermost of the laminated coil and wound on the outermost of the laminated coil;

a capstan and a pinch roller between which the tape is driven at said high rate of speed;

a loop buffer mechanism provided in a route in which the tape delivered from between the capstan and the pinch roller is wound on the reel, and having first, second and third guides;

said first guide being adapted to guide the tape so delivered in a direction in which the pinch roller is rotated and to deflect said tape toward said second guide so as to partially form a loop thereby;

said second guide being adapted to guide said tape from the first guide towards the reel in a curved manner; and said third guide being adapted to cause the tape so guided to be reversed back in the direction of the first guide so that substantially one freely standing loop is created, and then to smoothly and freely guide it towards the reel, whereby said smooth and free passage of said tape about said third guide means permits said loop to be adjustable in size so as to compensate for any variation in tension within said tape upon said reel and to maintain said tape properly tensioned.

2. An endless tape transporting device according to claim 1 in which the first guide comprises a guide plate located in the route of the tape delivered from between the capstan and the pinch roller, forming an acute angle to said route and extending towards said second guide.

3. An endless tape transporting device according to claim 2 in which said first guide further includes a guide pole disposed behind the guide plate and in contact therewith.

4. An endless tape transporting device according to claim 1 in which said second guide comprises a guide plate extending from the proximity of the pinch roller towards the proximity of the reel.

5. An endless tape transporting device according to claim 1 in which said third guide comprises a guide pole located in the neighborhood of said first guide and on the side of the reel.

6. An endless tape transporting device according to claim 5 in which said third guide further includes a guide plate located in the neighborhood of said guide pole so that the tape is travelled between said guide pole and said guide plate.

7. An endless tape transporting device according to claim 1 in which the tape is travelled at an angle of more then 30° which is defined between the direction in which it is moved through the guide plate of said first guide and the direction in which it is directly moved from the first guide towards the third guide without forming any buffer loop.

8. An endless tape transporting device used in an endless tape recording and reproducing apparatus which includes a driving mechanism for said transporting mechanism and a recording and reproducing electric unit for an endless tape, said endless tape transporting device comprising:

an endless tape reel adapted to coil the endless tape into a laminated coil so that the tape is delivered from the innermost of the laminated coil and wound on the outermost of the laminated coil;

a capstan and a pinch roller between which the tape is driven;

a loop buffer mechanism provided in a route in which the tape delivered from between the capstan and the pinch roller is wound on the reel, and having first, second and third guides;

said first guide being adapted to guide the tape so delivered in a direction in which the pinch roller is rotated and to deflect said tape toward said second guide and partially form a loop thereby; said second guide being adapted to guide said tape from the first guide towards the reel in a curved path; and said third guide being adapted to cause the tape delivered from said second guide to be reversed back in the direction of said first guide so that substantially one freely standing loop is created, and then to smoothly and freely guide it towards the reel, whereby said smooth and free passage of said tape about said third guide means permits said loop to be adjustable in size so as to compensate for any variation in tension within said tape upon said reel and to maintain said tape properly tensioned.

9. An endless tape transporting device comprising:

an endless tape reel adapted to coil thereon an endless tape into a laminated coil so that the tape is drawn from the innermost layer of the laminated coil and delivered to the outermost layer of said reel;

a capstan and a pinch roller between which the tape is driven for drawing said tape from said reel and delivering said tape to said reel;

a loop buffer mechanism disposed within the route through which the tape passes as said tape is delivered from said capstan and the pinch roller to said reel so as to be wound upon said reel;

first, second and third guide means included within said buffer mechanism, said first guide means guiding said tape from said capstan and pinch roller in the direction in which said pinch roller is rotated, said second guide means guiding the tape from said first guide means towards said reel, and said third guide causing the tape which has been guided by said second guide means, to be reversed in direction back toward said first guide means and said capstan and pinch roller and then guiding said tape towards said reel, said first guide means projecting close to the periphery of said capstan and forming an acute angle to said route of said tape as said tape is delivered to said guide means from said capstan and said pinch roller and extending towards said second guide means so as to deflect said tape towards said second guide means so as to partially form a loop thereby;

said second guide means projecting close to the periphery of said pinch roller and extending gradually from said pinch roller in a gentle curved manner toward said reel, the portion of said second guide means, disposed near said first guide means, being disposed substantially parallel to said deflected flow path of said tape so as to smoothly receive the same; and said third guide is disposed near said first guide means upon the side of said first guide means disposed toward said reel.

10. An endless tape transporting device according to claim 9 in which the tape is travelled at an angle of more than 30° which is defined between the direction in which it is moved through said first guide and the direction in which it is directly moved from the first guide towards the third guide without forming any buffer loop.

* * * * *